United States Patent

Jacobs

[15] 3,654,474

[45] Apr. 4, 1972

[54] PHOTOCHROMIC TIME DELAY UNIT

[72] Inventor: James W. Jacobs, Dayton, Ohio

[73] Assignee: General Motors Corporation, Detroit, Mich.

[22] Filed: May 15, 1970

[21] Appl. No.: 37,594

[52] U.S. Cl. ..........................250/206, 250/229, 250/237 R, 350/160 P

[51] Int. Cl. ..........................H01j 39/12

[58] Field of Search..........................350/160 P, 161, 160 R; 250/205, 206, 229, 237

[56] References Cited

UNITED STATES PATENTS

| | | | |
|---|---|---|---|
| 3,365,577 | 1/1968 | Teeg | 350/160 P |
| 3,134,019 | 5/1964 | Bishay | 350/160 P |
| 3,476,459 | 11/1969 | Reader | 350/160 P |

*Primary Examiner*—James W. Lawrence
*Assistant Examiner*—D. C. Nelms
*Attorney*—W. S. Pettigrew and J. C. Evans

[57] ABSTRACT

In preferred form, a time delay circuit including a light dependent variable resistance device having a housing divided into two compartments. A light source is located in one of the compartments and a light dependent resistor having a high dark resistance and a lower resistance when exposed to light is located in the other compartment. A photochromic lens is interposed between the light and the light dependent resistor to produce a timed control of the resistance value of the device. The device is connected in circuit with an electrical load by means of a single switch and a network that will simultaneously energize the light, the light dependent resistor, and load.

1 Claim, 3 Drawing Figures

INVENTOR.
James W. Jacobs
BY
J. C. Evans
ATTORNEY

PHOTOCHROMIC TIME DELAY UNIT

This invention relates to time delay devices and more particularly to electrical timers for varying the energization of an electrical load in accordance with changes in the electrical properties of a device connected in circuit therewith.

In domestic appliances and other devices needing time control one approach is to utilize a synchronous type electrical motor of the type found in an electrical clock to drive a plurality of cam devices for operating pluralities of switches into opened and closed positions. These devices are relatively economical but have many moving parts susceptible to wear.

In an attempt to solve this problem devices have been proposed of the type including a light source, a light dependent resistor in circuit with a load and means for varying the amount of light energy directed to the light dependent resistor for producing a preselected time delay energization of given components in the circuit.

One example of a circuit of this type is shown in my U.S. Pat. No. 3,321,635.

The time delay function in this device is established by means of a movable component in the form of a column of electrolite that is displaced along a bore at a speed which is governed by the rate of current flow therethrough. Thus, the device still retains certain non-static characteristics that can affect its operation.

Accordingly, one primary object of the present invention is to change the energization of an electrical component following a predetermined time delay by means of a device that is responsive to changes in the intensity of light against a light dependent resistor and which has no moving parts.

Still another object of the present invention is to provide a time delay system in which the control of an electrical load is produced solely by varying the amount of light energy to a light dependent resistor through a static device including a photochromic lens that changes from a colorless to a colored state when exposed to a light source that is connected in circuit and energized simultaneously with the electrical load controlled by the light dependent resistor.

Yet another object of the present invention is to provide a time delay control system in which an electrical load is in circuit connection with a light dependent resistor across a power source through a switch. And wherein the switch further connects a lamp across the power source when the load is connected thereto. A photochromic device is interposed between the lamp and the light dependent resistor and is operative to respond to exposure to light rays from the lamp to change from a colorless to a colored state which in turn produces a predetermined time delay control of the resistance characteristics of the light dependent resistor for regulating the voltage condition across the load as a function of time.

These objects are attained by means of a device that includes an opaque housing having a cover and a base. The opaque housing is divided into first and second compartments by a photochromic lens connected between the base and the cover. The photochromic lens includes a transparent substrate and a layer of photochromic material that is normally colorless but which changes to a colored state when exposed to an ultraviolet component of an energized lamp.

The thermochromic material is on a base of quartz material which allows light rays to pass from the first compartment when the light is energized into the second compartment where they act on a light dependent resistor.

The lamp is supported by the base and has its terminals connected in parallel circuit with the light dependent resistor.

The light dependent resistor is in circuit with an electrical load and a switch for connecting the load and resistor across a power source.

A control voltage is established by the light dependent resistor. The control function of the device is initiated when the load energization switch is closed. Simultaneously, the light turns on and the resistance of the light dependent resistor is maintained under a time controlled response in accordance with the rate of change of the photochromic layer from a colorless to a colored state. First the light dependent resistor sees the full light intensity and responds to have a low resistance whereby the load is maintained at a high voltage. As the photochromic layer changes from the colorless to the colored state the intensity of light passing to the light dependent resistor is reduced and the resistance thereof will increase to reduce the voltage across the load following a predetermined time delay.

Further objects and advantages of the present invention will be apparent from the following description, reference being had to the accompanying drawings wherein a preferred embodiment of the present invention is clearly shown.

Figure 1:
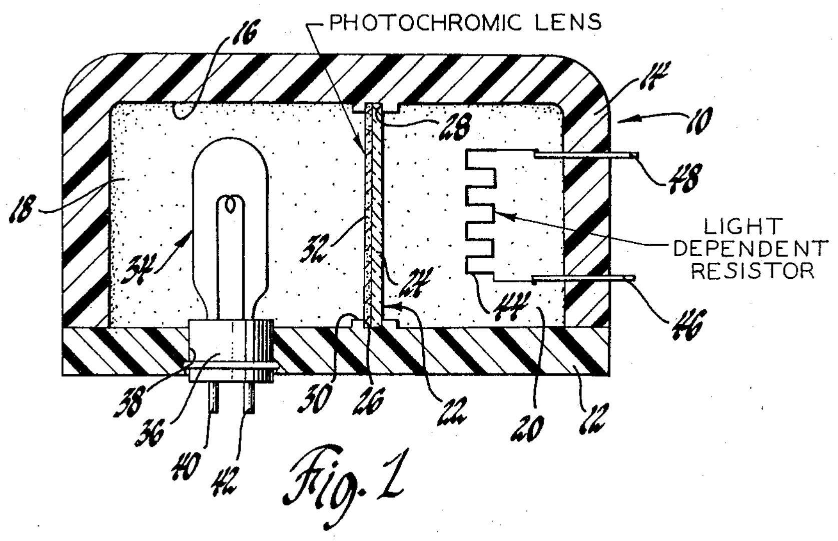
FIG. 1 is a vertical sectional view of a photochromic time delay unit in accordance with the present invention.

Referring now to the drawings and more particularly to FIG. 1 a device is illustrated that includes a housing 10 with a base 12 and a raised cover 14 both made of an opaque material which prevents light from passing from outside the housing into an interior space 16 between the base 12 and cover 14.

The interior space 16 is separated into a first compartment 18 and a second compartment 20 by a photochromic lens or filter 22.

The lens 22 includes a support element 24 of a suitable full spectrum light transmissive material such as quartz.

It fits into a base groove 26 at one end thereof and in a cover groove 28 at the opposite end thereof to cover the full planar extent of an opening 30 between the first and second compartments 18, 20.

The surface or side of the support element 24 facing toward the first compartment 18 is covered by a layer 32 of photochromic material which has the properties of changing from a colorless to a colored state when the layer 32 is exposed to a light source Examples of suitable photochromic materials are taught in U.S. Pat. Nos. 3,272,646 and 3,370,902. In both of these cases the color change characteristics of the material are produced by exposure to a source of ultra-violet irradiation.

The source of ultra-violet irradiation in this arrangement is produced from the ultra-violet component from an incandescent lamp 34 located in the first compartment 18.

More particularly, the lamp 34 has a base 36 thereof supported in a socket 38 in the base 12.

It further includes a pair of terminals 40, 42 adapted to be connected in shunt relationship to a light dependent resistor (LDR) 44 located in the second compartment 18.

More particularly, the LDR is located in proximity to the lens 22 to receive light directed therethrough from the lamp 34.

The LDR 44 includes a pair of terminals 46, 48 adapted to be connected in circuit with an electrical load 50 for varying the energization thereof in accordance with LDR resistance changes.

Figure 2:
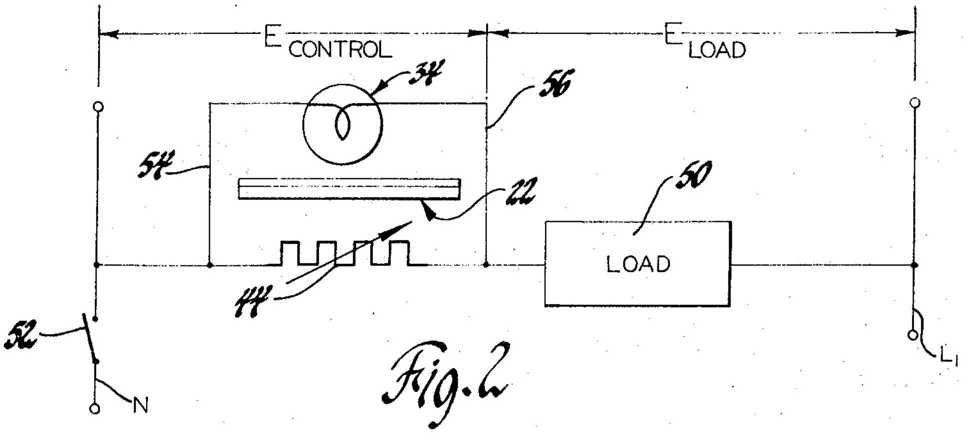
FIG. 2 is a time delay circuit including the device of FIG. 1 and practicing the present invention.

Referring now to FIG. 2 the photochromic time delay unit is included in a circuit that connects electrical load 50 across a power source represented by wires $N–L_1$.

More particularly, the circuit includes a switch 52 that is in series connection with one end of the LDR 44 which in turn is electrically connected to one side of the load 50. The opposite side of the load 50 is connected to wire $L_1$.

The switch 52 further controls energization of the lamp 34 through a circuit including a conductor 54 to one side of the lamp 34 and a conductor 56 to the opposite side thereof which serve to electrically connect the lamp 34 in shunt relationship around the LDR 44.

As seen in FIG. 2 the amount of light rays passing from the lamp 34 to the LDR is controlled by the photochromic properties of the lens 22.

Figure 3:
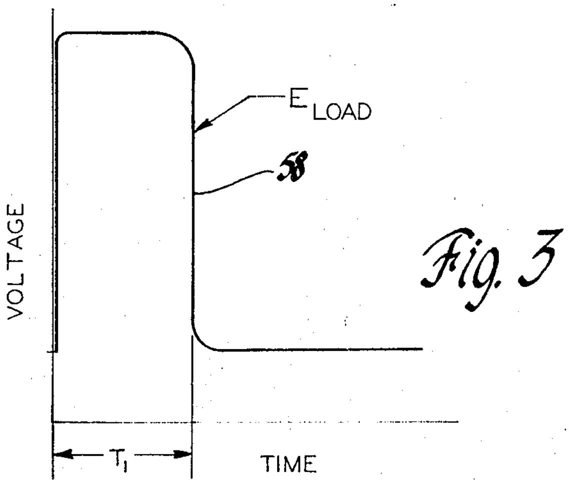
FIG. 3 is a chart showing the relationship of the load voltage to time as established by the device of FIG. 1.

Referring now to FIG. 3 a voltage time relationship for the voltage across the load 50 is illustrated by curve 58.

The load voltage is maintained at a high level for a predetermined period of time $T_1$ at which point the combination properties of the photochromic lens 22 and the light dependent resistor 44 will produce a sharp reduction in the voltage $E_{LOAD}$.

More particularly, this time function control of voltage is established as follows:

When the switch 52 is initially closed the lamp 34 is energized to shine on the layer 32 of photochromic material which directly faces the lamp 34 as shown in FIG. 1. The layer of material gradually changes from a colorless or transparent state to a colored state which is nearly opaque and acts to filter out the amount of light falling on the LDR. This filter effect varies with time once the lamp is energized.

In the circuit illustrated in FIG. 2 when the lamp 34 is energized the normally high dark resistance of the LDR is immediately lowered because the photochromic lens is colorless and the combination of lamp 34 and lens 22 represents a high intensity light source.

However, as the lamp 34 continues to shine on the layer of photochromic material 32 it starts to darken thereby to reduce the amount of light shining or impinging on the light dependent resistor and the combination of lamp 34 and lens 22 represents a low intensity light source. This causes a return toward the dark resistance level of the LDR (an increased resistance) which in turn increases the control voltage thereby to effectively reduce the voltage across the load.

Another important feature of this invention is that while the voltage on the load is lowered the voltage on the lamp 34 is increased. More particularly, as the photochromic material starts to change color the LDR resistance increases and there is a rapid increase in the voltage applied to the lamp 34. This causes the lamp intensity to increase and cause an even more rapid darkening of the photochromic material to give a snap action effect of voltage reduction across load 50 as shown by the sharp break in curve 58 at time $T_1$.

While the embodiments of the present invention, as herein disclosed constitute a preferred form, it is to be understood that other forms might be adopted.

What is claimed is:

1. A photochromic time delay assembly comprising: an opaque housing including first and second compartments, means for closing said compartments against entry of light from outside said housing, a lamp in one of said compartments, a photochromic lens separating said compartments including a layer of photochromic material thereon operative to change from a transparent state to an opaque state when exposed to light rays from said lamp, a light dependent resistor having a low resistance when exposed to a high intensity light source and a high resistance when exposed to a low intensity light source, said light dependent resistor being exposed to light from said energized lamp following passage thereof through said photochromic lens, an energization circuit including a switch, said light dependent resistor and an electrically energizable load, said switch connecting said load and light dependent resistor across a power source, means including said switch for simultaneously energizing said lamp when said load is connected across the power source, said light dependent resistor having a low resistance when the switch is initially closed to produce a high voltage across the load, said lamp and lens responding to energization of the load by said switch to cause said lens to become more opaque to produce a time controlled reduction of light impinging on said light dependent resistor to increase the resistance of said resistor to produce a reduced voltage across the load following a time delay.

* * * * *